(12) United States Patent
Batsakis et al.

(10) Patent No.: US 8,392,312 B2
(45) Date of Patent: Mar. 5, 2013

(54) ADAPTIVE SCHEDULING OF STORAGE OPERATIONS BASED ON UTILIZATION OF A MULTIPLE CLIENT AND SERVER RESOURCES IN A DISTRIBUTED NETWORK STORAGE SYSTEM

(75) Inventors: Alexandros Batsakis, San Francisco, CA (US); Arkady Kanevsky, Swampscott, MA (US); James Lentini, Woburn, MA (US); Thomas Talpey, Stow, MA (US)

(73) Assignee: NetApp, Inc., Sunnyvale, CA (US)

( * ) Notice: Subject to any disclaimer, the term of this patent is extended or adjusted under 35 U.S.C. 154(b) by 629 days.

(21) Appl. No.: 12/237,307

(22) Filed: Sep. 24, 2008

(65) Prior Publication Data

US 2010/0076805 A1   Mar. 25, 2010

(51) Int. Cl.
*G06Q 40/00* (2012.01)
*G06Q 30/00* (2012.01)
*G06Q 10/00* (2012.01)
*G06Q 20/00* (2012.01)

(52) U.S. Cl. .......... 705/37; 705/35; 705/26.3; 705/7.25; 705/7.22; 705/80

(58) Field of Classification Search .................. 705/37, 705/35, 26, 7, 8, 80
See application file for complete search history.

(56) References Cited

U.S. PATENT DOCUMENTS

| | | | | |
|---|---|---|---|---|
| 5,640,569 A | * | 6/1997 | Miller et al. | 710/241 |
| 6,006,194 A | * | 12/1999 | Merel | 705/7.26 |
| 6,968,323 B1 | * | 11/2005 | Bansal et al. | 705/80 |
| 7,333,993 B2 | | 2/2008 | Fair | |
| 7,788,133 B2 | * | 8/2010 | Delenda | 705/26.1 |
| 7,899,734 B2 | * | 3/2011 | Ausubel et al. | 705/37 |
| 2003/0126260 A1 | | 7/2003 | Husain et al. | |
| 2004/0010592 A1 | | 1/2004 | Carver et al. | |
| 2006/0069621 A1 | | 3/2006 | Chang et al. | |
| 2008/0072231 A1 | | 3/2008 | Yoshida | |
| 2008/0109343 A1 | | 5/2008 | Robinson et al. | |
| 2008/0133872 A1 | | 6/2008 | Fair | |

(Continued)

FOREIGN PATENT DOCUMENTS

| EP | 1693763 A1 | 8/2006 |
|---|---|---|
| WO | WO-0188811 A2 | 11/2001 |

OTHER PUBLICATIONS

Amir, et al., "A Cost-Benefit Flow Control for Reliable Multicast and Unicast in Overlay Networks", IEEE/ACM Transactions on Networking (TON), vol. 13, pp. 1094-1106, Oct. 2005.

(Continued)

*Primary Examiner* — Ella Colbert
*Assistant Examiner* — Scott S Trotter
(74) *Attorney, Agent, or Firm* — Perkins Coie LLP

(57) ABSTRACT

Scheduling operations such as asynchronous file system operations in a network storage system is accomplished by applying a bid-price online auction methodology, in which bid (willingness-to-pay) values and price (cost) values are dynamically set by storage clients and a storage server, respectively, based on utilization of computing resources. The system provides a framework for adaptively scheduling asynchronous file system operations, managing multiple key resources of the distributed file system, including network bandwidth, server I/O, server CPU, and client and server memory utilization. The system can accelerate, defer, or cancel asynchronous requests to improve application-perceived performance. Congestion pricing via online auctions can be employed to coordinate the use of system resources by clients, so clients can detect shortages and adapt their resource usage.

30 Claims, 8 Drawing Sheets

U.S. PATENT DOCUMENTS

2008/0201253 A1* 8/2008 Gray et al. .................. 705/37

OTHER PUBLICATIONS

Amir, et al., "A Low Latency, Loss Tolerant Architecture and Protocol for Wide Area Group Communication", in proceeding of International Conference on Dependable Systems and Networks, IEEE Computer Society Press, pp. 327-336, Jun. 2000.

Awerbuch, et al., "Competitive Routing of Virtual Circuits with Unknown Duration" Society for Industrial and Applied Mathematics, ISBN: 0-89871-329-3, pp. 1-13, Feb. 14, 1995.

Batsakis, et al., "Adaptive Request Scheduling Via Holistic Research Management in the Network File System", Proceedings of the 7th Conference on File and Storage Technologies, San Francisco, California, USENIX Association, pp. 1-14, 2009.

Batsakis, et al., "AWOL: An Adaptive Write Optimizations Layer", Proceedings of the 6th USENIX Conference on File and Storage Technologies, San Jose California, Article No. 5, pp. 67-80, 2008.

"CAIRN Testbed Operations Center" http://web.archive.org/web/20041127084248/http://www.cairn.net, p. 1 of 1.

"DAFS: Direct Access File System Protocol" Version: 1.00, pp. 1-5, Revision Date Sep. 1, 2001.

International Search Report PCT/US2009/058087 dated Apr. 20, 2010, pp. 1-3.

Jacobson, et al., "Congestion Avoidance and Control", ACM Computer Communication Review, Proceedings of the Sigcomm 88 Symposium in Stanford, California, vol. 18, pp. 1-25, Aug. 1988.

Kelly, et al., "Rate Control for Communication Networks: Shadow Prices, Proportional Fairness and Stability", JSTOR: The Journal of the Operation Research Society, vol. 49, No. 3, pp. 1-32, Mar. 1998.

Key, et al., "Congestion Pricing for Congestion Avoidance", Microsoft Research, Microsoft Corporation One Microsoft Way, Technical Report, MSR-TR-99-15, pp. 1-16, Feb. 1999.

Written Opinion PCT/US2009/058087 dated Apr. 20, 2010, pp. 1-4.

Supplementary European Search Report, EP Patent Application No. EP 09 81 6807 dated Oct. 30, 2012, pp. 1-2.

* cited by examiner

ADAPTIVE SCHEDULING OF STORAGE OPERATIONS BASED ON UTILIZATION OF A MULTIPLE CLIENT AND SERVER RESOURCES IN A DISTRIBUTED NETWORK STORAGE SYSTEM

FIELD OF THE INVENTION

At least one embodiment of the present invention pertains to network storage systems, and more particularly, to adaptive scheduling of storage operations based on utilization of multiple client and server resources in a distributed network storage system.

BACKGROUND

Distributed file systems such as used in network storage systems suffer performance problems resulting from poor allocation of resources in response to changing workloads. The resources in this context include memory, processor cycles, and network bandwidth. In a healthy distributed file system, applications make input/output (I/O) requests to a storage server and receive a response to each request within acceptable latency limits. However, distributed file systems can be subject to enormous variations in demand. Performance problems typically arise as more capacity, more users, or more workload are added to existing systems. Additionally, file system clients generally operate selfishly, trying to maximize their own throughput, which stresses system resources. When a system resource becomes congested, the increase in latency can be sudden and exponential.

File system operations have different priorities implicitly. While some file system operations need to be performed on demand, many can be scheduled; these two classes of operations can be termed synchronous and asynchronous operations, respectively. Asynchronous operations include writes and read-aheads. With writes, the calling application is released once the write completes to local memory. Read-aheads are submitted by the file system and have no application awaiting their completion. In some distributed file system, asynchronous operations make up a substantial fraction (e.g., about one third) of all requests.

Current distributed file systems suffer from a priority inversion between synchronous and asynchronous operations, where asynchronous operations are actually given preference to synchronous operations. When this priority inversion occurs, an application that has issued a synchronous operation has to wait until previously issued asynchronous operations complete. This priority inversion adversely affects application—(client—) perceived performance, which is a problem that existing approaches fail to address.

Current resource management solutions tend to be limited to only isolated portions of the entire system. For example, quality of service (QoS) techniques encode priorities between clients or I/O streams in an effort to guarantee individual service level agreements (SLAs). They employ feedback-based I/O throttling in order to limit resource congestion and avoid throughput-based crashes. However, these approaches are based on server-oriented performance metrics only, such as I/Os per second (IOPS), I/O throughput, and network utilization, which in many cases do not correspond well with application-perceived (user-perceived) performance.

Server-oriented metrics are insensitive to application-perceived performance, because they fail to distinguish the urgency and relative priority of file system operations by I/O type or based on client state. From the server's perspective, all client operations at any given time are equally important, which is generally not true.

Congestion pricing is a technique sometimes used for flow control in network environments. However, distributed file systems present a richer, more complex environment, in that there are multiple different resources to manage. In distributed file systems, resources are heterogeneous: in most cases, no two resources are directly comparable. For example, one cannot directly balance CPU cycles against memory utilization or vice versa. Nor does either of these resources map naturally to network bandwidth. This makes the assessment of the load on a distributed system difficult. The performance-limiting factors in a distributed file system often depend on a complex combination of system configuration, workload, and the client population. As such, optimizing I/O systems or networks in isolation does not suffice.

SUMMARY

The technique introduced here includes, in a network storage system, scheduling storage operations, particularly asynchronous file system operations, by applying a bid-price auction model, in which bid (willingness-to-pay) values and price (cost) values are dynamically set by storage clients and a storage server, respectively, based on utilization of computing resources of the storage clients and server. In certain embodiments, this technique includes a "holistic" framework for adaptively scheduling asynchronous requests in a distributed file system. The system is holistic in that it manages multiple key resources of the distributed file system, including network bandwidth, server I/O, server CPU, and client and server memory utilization. The system can accelerate, defer, or cancel asynchronous file system requests in order to improve application-perceived performance directly. In certain embodiments, the technique employs congestion pricing via online auctions to coordinate the use of system resources by file system clients, so that they can detect shortages and adapt their resource usage.

Other aspects of the technique introduced here will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
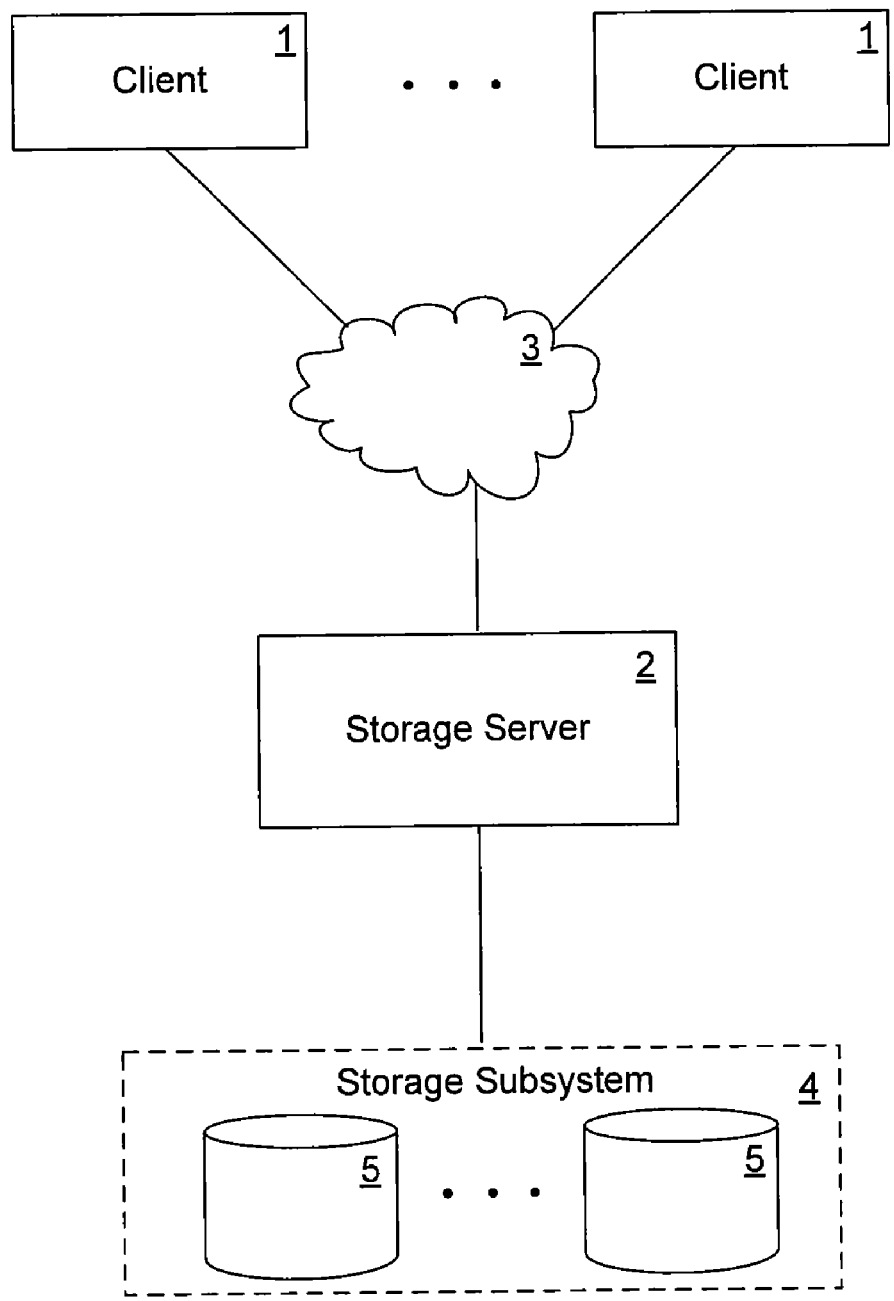
FIG. 1 illustrates an example of a network storage system.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

A network "file system" is discussed in this description as an example. Note, however, that the term "file system" is to be interpreted broadly and is not necessarily limited to a system which operates on "files" per se as its fundamental unit of data storage or management. That is, a "file system" as the term is used herein could instead operate based on other fundamental units of data, such as blocks (e.g., subsets of files).

Further, while the technique introduced here is described as an extension or modification of network file system (NFS), the broad principles introduced here are potentially applicable in contexts other than NFS, such as with Common Internet File System (CIFS).

I. Overview

When system resources approach critical capacity in a network file system, preference should be given to synchronous requests, because they block the calling application. In a sense, a network file system needs to apply priority scheduling, preferring blocking to non-blocking requests, and priority inheritance, e.g., performing writes that block reads at high priority to ensure that non-time-critical (asynchronous) I/O traffic does not interfere with on-demand (synchronous) requests.

Introduced here is a performance management technique for distributed file systems that dynamically schedules client-requested operations based on their priority and on the utilization of the system resources. The technique complements QoS approaches. It does not offer the performance guarantees to applications on which one might build SLAs. Rather, it takes a best-effort approach to improve application-perceived performance by minimizing latency and maximizing throughput for synchronous file system operations.

One aspect of this technique is a holistic algorithm that assesses system load, manages system resources, and schedules client operations. "Holistic" in this context means that the framework takes into consideration multiple key resources among all of the clients and servers in a given distributed storage system, from client caches to server disk subsystems. This is advantageous, because optimizing each resource independently would fail to capture performance dependencies among the system resources. The technique introduced here employs online auctions and congestion pricing that unify different types of resources with a single pricing model.

Servers indicate the value of their resources (price or cost) and clients indicate the importance of file system operations (willingness to pay, or "bid") to allow the system to schedule requests and adapt to different configurations and time-varying or workload-varying resource constraints. The technique can delay, accelerate or cancel asynchronous requests. This helps to avoid congestion in the network and server I/O system caused by non-critical operations.

The technique according to one embodiment is implemented in the form of a system termed Congestion-Aware NFS (CA-NFS), which is an extension to network file system (NFS), and which is implemented as modifications to the Linux NFS client and server and the Linux memory manager. Note, however, that the changes are not specific to Linux and are applicable to any NFS implementation. CA-NFS is compatible with the NFS protocol and, thus, CA-NFS and regular NFS clients and servers can co-exist. It is believed that that CA-NFS outperforms NFS and improves application-perceived performance significantly in a wide variety of workloads. Further, CA-NFS allows clients and servers to share and exchange resources without affecting autonomy or sacrificing security. Furthermore, the principles introduced here can be applied in contexts other than NFS, such as CIFS.

The performance management technique introduced here alters the scheduling of lower-priority distributed file system requests (e.g., asynchronous requests) to reduce their interference with synchronous requests. The technique provides a new approach to resource management by implicitly managing and coordinating the usage of the file system resources among all clients in a given system. The technique is also advantageous in its adaptation of scheduling based on application-perceived performance, rather than based on server-centric metrics. It unifies fairness and priorities in a single algorithmic framework, so that realizing optimization goals benefits the file system users, not the file system servers.

II. Network Environment

Refer now to FIG. 1, which shows an example of a network storage system in which the technique introduced here can be implemented. In FIG. 1, a storage server 2 is coupled to a storage subsystem 4 and to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the storage subsystem 4 is managed by the storage server 2. The storage server 2 and the storage subsystem 4 are collectively referred to as the storage system. The storage server 2 receives and responds to various input/output (I/O) requests (e.g., read and write requests) from the clients 1, directed to data stored in or to be stored in storage subsystem 4. The storage subsystem 4 includes a number of nonvolatile mass storage devices 5, which can be, for example, conventional magnetic or optical disks or tape drives; alternatively, they can be non-volatile solid-state memory, such as flash memory, or any combination of such devices. The mass storage devices 5 in storage subsystem 4 can be organized as a Redundant Array of Inexpensive Disks (RAID), in which case the storage server 2 can access the storage subsystem 4 using a conventional RAID algorithm for redundancy.

The storage server 2 can be, for example, a storage server which provides file-level data access services to clients, such as commonly done in a NAS environment, or block-level data access services such as commonly done in a SAN environment, or it may be capable of providing both file-level and block-level data access services to clients. Further, although the storage server 2 is illustrated as a single device in FIG. 1, it can have a distributed architecture. For example, the storage server 2 can be implemented with its various components located on separate nodes, separate address spaces, etc.

III. Architecture

Figure 2:
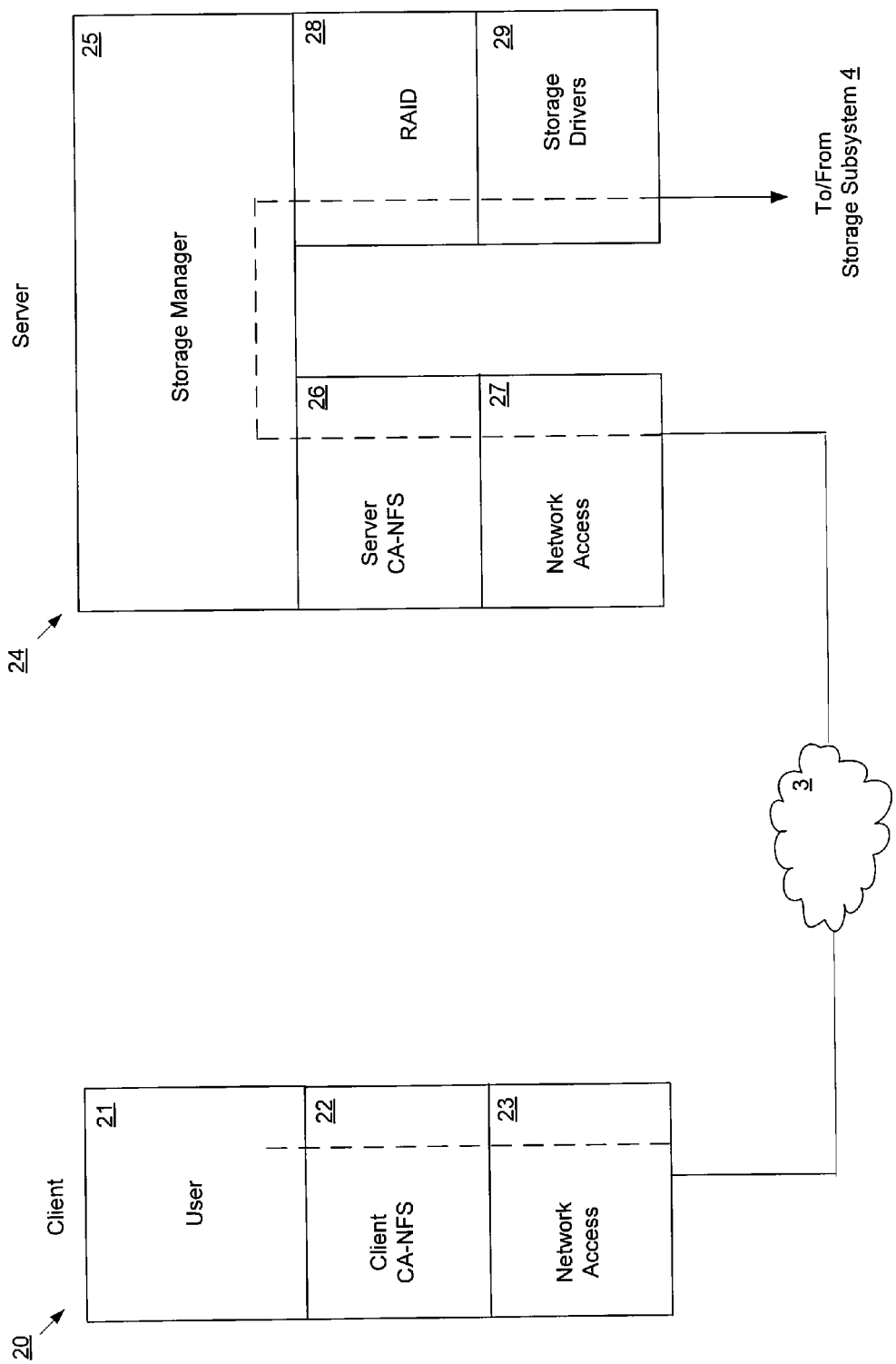
FIG. 2 is a block diagram of client and server functional layers in the network storage system of FIG. 1.

In certain embodiments, the main functionality of a client 1 and server 2 are implemented in software. An example of the architecture of such software is shown in FIG. 2. As shown, the client 1 includes a software stack 20, the key layers of which include a user application ("user layer") 21, a client CA-NFS layer 22 logically below the user layer, and a network access layer 23 logically below the client CA-NFS layer 22. The user layer is 21, for example, an application which generates requests for file system operations, e.g., reads and writes. The client CA-NFS layer 22 is the layer in which the client-based aspects of the technique introduced here are primarily implemented. The network access layer 23 includes one or more network drivers that implement one or more lower-level protocols to communicate over the network, such as Ethernet, Internet Protocol (IP), Transport Control Protocol (TCP), Fibre Channel Protocol (FCP), etc.

In the storage server 2, storage related operations are controlled by executable software embodying a storage operating system 24. In the illustrated embodiment, the storage operating system 24 includes several software modules, or "layers". The layers include a storage manager 25, which is the core functional element of the storage operating system 24. The storage manager 25 imposes a structure (e.g., a hierarchy) on the data stored in the storage subsystem 4; in other words, storage manager 25 manages a file system. Storage manager 25 also services read and write requests and other file system operations from clients 1.

Logically "under" the storage manager 25, to allow the storage server 2 to communicate over the network 3 (e.g., with clients 1), the storage operating system 24 also includes a server CA-NFS layer 26 and a network access layer 27. The server CA-NFS layer 26 is the layer in which the server-based aspects of the CA-NFS technique introduced here are primarily implemented. In practice, there may be additional layers are modules (not shown) in the storage server 2 to allow the storage server to communicate using other protocols, such as Common Internet File System (CIFS), Hypertext Transfer Protocol (HTTP) and Internet small computer system interface (iSCSI). The network access layer 27 includes one or more network drivers that implement one or more lower-level protocols to communicate over the network, such as Ethernet, IP, TCP, FCP, User Datagram Protocol (UDP), etc.

Also logically under the storage manager 25, to allow the storage server 2 to communicate with the storage subsystem 4, the storage operating system 24 includes a RAID layer 28 and a storage driver layer 29. The RAID layer 28 implements a RAID scheme such as RAID-0, RAID-4, RAID-5 or RAID-DP, while the storage driver layer 29 implements a lower-level storage device access protocol, such as Fibre Channel Protocol (FCP) or small computer system interface (SCSI).

In certain embodiments, the storage operating system 24 may have a distributed architecture. For example, the server CA-NFS layer 26 and the network access layer 27 can be contained in one node (e.g., an "N-module") while the storage manager 25, RAID layer 28 and storage driver layer 29 are contained in a separate node (i.e., a "D-module"). In such an embodiment, the N-module and D-module can communicate with each other (and, possibly, other N- and D-modules) through some form of physical interconnect.

Note that in alternative embodiments, any or all of the layers discussed above can be implemented in dedicated hardware rather than in software or firmware.

IV. Managing Application-Perceived Performance with Online Auctions

In one embodiment CA-NFS employs the use of online auctions to coordinate the use of system resources by its clients. CA-NFS is holistic in that it unifies the management of the most important system resources under a single pricing model. In distributed file systems, resources are heterogeneous: no two of them are directly comparable. One cannot directly balance CPU cycles against memory utilization or vice versa. Nor does either resource convert naturally into network bandwidth. This makes the assessment of the load on a distributed system difficult.

The approach introduced here allows the system to address different bottlenecks in different configurations and respond to changing resource limitations over time. The holistic approach introduced here goes beyond end-to-end, in that CA-NFS balances resource usage across multiple clients and servers (end-to-end also connotes network endpoints, whereas holistic management goes from client applications to server disk systems).

In CA-NFS, servers encode their resource constraints by increasing or decreasing the price of reads and writes in the system (this also applies to metadata I/O operations). For example, servers that are running out of available memory or not able to write to disk as fast as the network delivers data will increase the price of operations in order to "push back" at clients. Clients adapt by accelerating, deferring, or canceling operations depending upon server prices and their willingness to pay (WTP). Clients that are not resource constrained will be willing to pay less and will reduce their presented load. If the local client resources are close to critical capacity, the client sends the request to the server even if the server price is high.

Note that the term WTP does not necessarily imply that a client must actually pay for a resource in any real sense. In some embodiments, each client may receive a finite (perhaps replenishable) account of points or credits, where a client does in fact pay such points/credits to have a file system operation performed. In another embodiments, however, a client may simply compute a WTP according to an algorithmic framework such as described below, where disposition of a file system operation is based on whether the WTP exceeds the server's price, but no actual price is paid by the client to have the operation performed.

A. Applying CA-NFS in Practice

Figure 3:
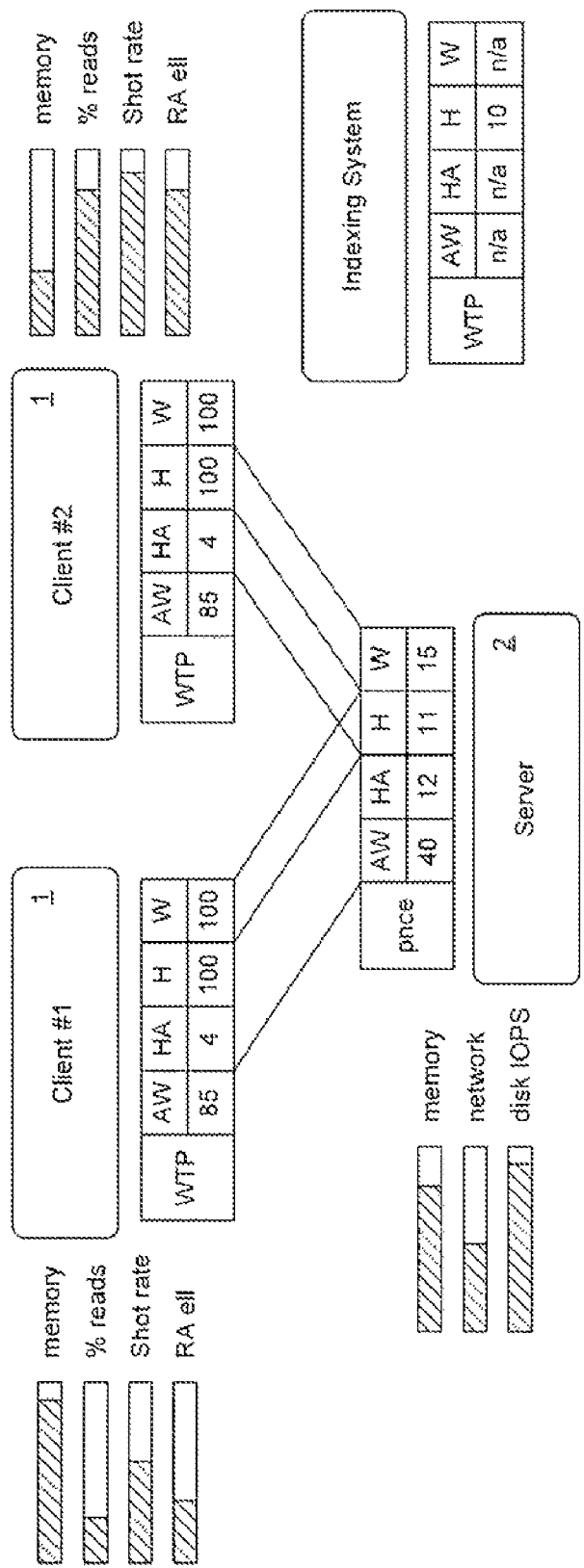
FIG. 3 illustrates an example of the operation of a Congestion Aware Network File System (CA-NFS) auction model.
Figure 4A:
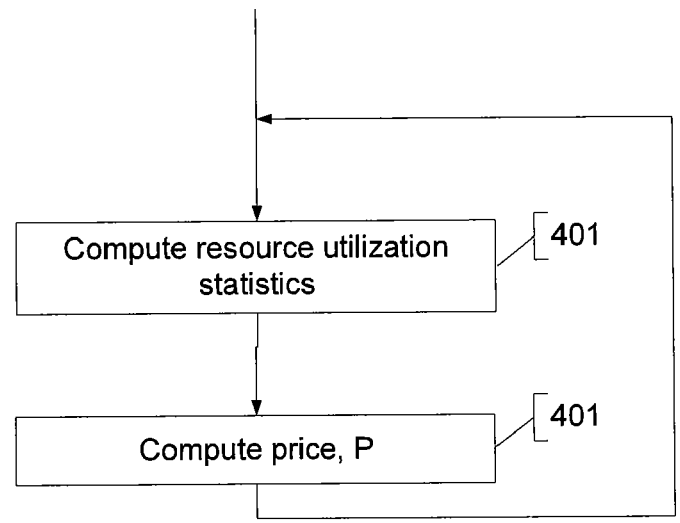
FIGS. 4A and 4B are flowcharts of processes that can be performed within a storage server 2 as part of the CA-NFS.
Figure 4B:
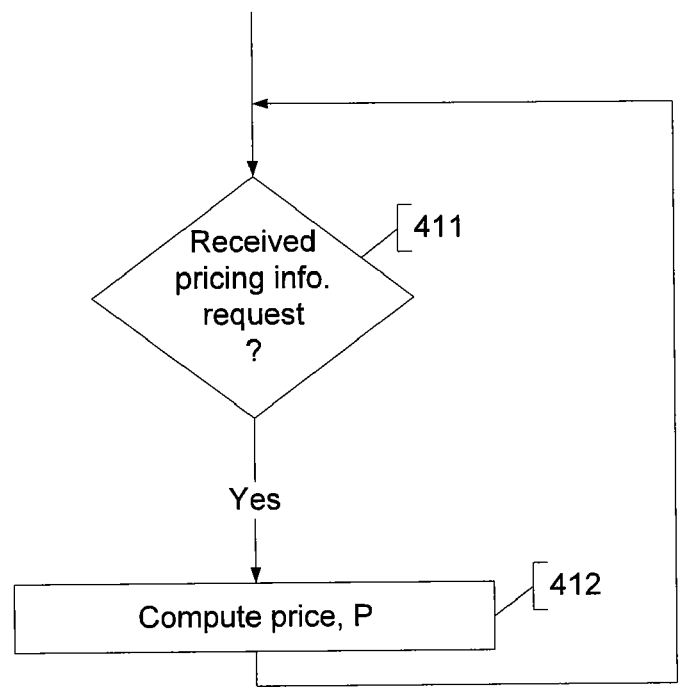

FIG. 3 illustrates the high-level operation of CA-NFS. The server 2 sets the price of different operations to manage its resources and network utilization in a coordinated manner. In this example, the server's memory is near full occupancy and it is near its maximum rate of IOPS. Based on this, the server 2 sets the price of asynchronous writes to be relatively high, because they consume memory at the server and add IOPS to the system.

Clients 1 adapt their WTP for asynchronous operations based on their local state. Client #1 is nearing its memory bound and, if it runs out of memory, applications will block awaiting the completion of asynchronous writes. Even though the price of asynchronous writes is high, the client is willing to pay. Servers notify clients about their prices as part of the CA-NFS protocol, as discussed further below. A client 1 will avoid exhausting its memory while it can afford the server's asynchronous write price. At the same time, the system values server memory more highly, because running out of memory at the server affects all clients. Client #2 has available memory, so it stops writing "dirty" data (data that has been modified only in RAM prior to being saved to stable storage). This reduces the load on the server 2 and allows the system to exchange memory consumption between clients. When the server 2 clears its memory, it will lower the price of asynchronous writes and Client #2 will commence writing again.

A client's willingness to perform read-ahead depends on its available memory to contain read ahead pages and the relative effectiveness of read-ahead. Inaccurate read-ahead consumes system resources to no benefit. In the example of FIG. 3, Client #2 has available memory, a read-dominated workload, and good read-ahead effectiveness so that read-ahead turns future synchronous reads into cache hits. Thus, Client #2 is willing to pay the server's price. Client #1 has a write-dominated workload, little memory, and a relatively ineffective cache. Therefore, Client #1 halts read-ahead requests to conserve resources for other tasks.

B. Asynchronous Writes

Application—(client—) perceived performance depends critically on avoiding synchronous waits for asynchronous operations. This is a fact that existing approaches to resource management overlook. The effectiveness of asynchronous write operations depends on the client's current memory state. Writes are asynchronous only if there is available memory; a system will block any and all writes for which memory cannot be allocated to perform them in a deferred manner. Memory pressure has an adverse effect on reads as well. All pending writes that must be written to storage interfere with concurrent reads, which results in queuing delays at the network and disk.

Regular NFS clients write data to the server's memory immediately upon receiving a write ( ) system call and also buffer the write data in local memory. The buffered pages are marked as dirty at both the client and the server. To save these data to disk, the NFS protocol provides a commit operation, sent as a message from the client to the server. The decision of when to commit the data to the server depends on several factors. Traditionally, systems used a periodic update policy in which individual dirty blocks are flushed when their age reaches a predefined limit. Modern systems stage dirty pages to the server when the number of dirty pages in client memory exceeds a certain percentage, a condition which can be called the "flushing point", typically a small fraction of the available memory. After a sufficient number of such pages have reached the server, the client requests the server to commit them, in order to make client buffers again available. This continuous flush/commit cycle uses resources inconsistently, and is relatively expensive when it is active.

In contrast to regular NFS, CA-NFS clients adapt their asynchronous write behavior by either deferring or accelerating a write. Deferring a write delays copying dirty data to server memory upon receiving a write request. Instead, clients keep data in local memory only, until the price of using the server resources is low. To make write deferral possible, the operation of the write-back daemon on the clients is modified by dynamically changing the flushing point value based on the pricing mechanism, to dictate when the write-back of dirty pages should begin. This modification overrides the static limits imposed by current operating system memory managers.

Deferring a write consumes client memory with dirty pages, saves server memory, and delays the consumption of network bandwidth and server disk I/O. However, it also faces the risk of imposing higher latency for subsequent synchronous commit operations. This is because a file sync operation may require a network transfer of the dirty buffers from the client to server memory. Deferring a write also may interfere with read-ahead, since it consumes memory that can be used for read-ahead. This, may impact read operations and turn them from local reads into reads from a server.

Accelerating a write forces the CA-NFS server to sync the data to stable storage immediately, so that the client does not need to buffer all of the dirty pages associated with the operation. The idea behind write acceleration is that if the server resource utilization is low, there is no need to defer the write to a later time. Note that accelerating a write does not make the write operation synchronous. Instead, it invokes the write-back daemon at the client immediately. This operation saves client memory, preserving the client's cache contents; however, it also consumes server memory, possibly increases the disk utilization, and uses network bandwidth immediately.

The server prices asynchronous writes based on its memory, disk and network utilization. If the server memory contains blocks that are currently accessed by clients, setting high prices forces clients to defer writes in order to preserve cache contents and maintain a high cache hit rate. Accordingly, if the disk or network resources are heavily utilized, CA-NFS defers writes until the load decreases. Clients price asynchronous writes based on their ability to cache writes, i.e., available memory.

C. Asynchronous reads

CA-NFS clients attempt to optimize the scheduling of asynchronous reads (read-ahead). If the server price for read-ahead is low and read-ahead is effective, clients perform read-ahead aggressively. If the price of the server resources is high, clients cancel read-ahead in favor of synchronous operations. Canceling a read-ahead saves client memory, delays the consumption of network bandwidth, but often converts cache hits into synchronous reads because data were not pre-loaded into the cache.

D. Deferring Synchronous Operations

Pricing synchronous operations wisely enables the system to manage non-standard I/O processes. Distributed file systems often have lower-priority I/O tasks, such as data mining, indexing, auditing, etc. Capping the WTP for synchronous operations causes these low-priority tasks to halt automatically when re-sources become congested. This is illustrated in FIG. 3 with reference to an indexing client. The server's price for synchronous reads exceeds the indexing client's WTP, so the client sits idle awaiting a period of lower I/O load on the server.

For regular clients, there is no benefit in delaying synchronous operations, because applications block awaiting their completion. Synchronous reads and writes block the requesting applications, and it is desirable to reduce synchronous waits. The client's WTP for synchronous operations should be greater than the maximum possible server price and equal to the maximum possible WTP for asynchronous operations.

Clients can also encode application priorities and differentiate between background I/O processes and application workload by charging different processes different prices. Differential pricing can also be used to encode operating system (OS) process priority in the I/O system.

V. System Design

Underlying the entire network storage system is a unified algorithmic framework, which is based on competitive analysis for the efficient scheduling of distributed file system operations with respect to system resources. As will now be described, the algorithmic framework can be constructed, first, by describing an auction for a single resource, and then building a pricing function for each resource and assembling these functions into a price for each NFS operation.

A. Algorithmic Foundation

For each resource, we define a simple auction in an on-line setting in which the bids arrive sequentially and unpredictably. A bid will be accepted immediately if it is higher than the price of the resource at that time.

A goal is to find an online algorithm that is competitive to the optimal offline algorithm in any future request sequence. The performance degradation of an online algorithm (competitive ratio) is defined as $r=\max (B_{offline}/B_{online})$ in which $B_{offline}$ is the benefit from the offline optimal algorithm and $B_{online}$ is the benefit from the online algorithm. The lower bound can be established at $\Omega(\log k)$, in which k is the ratio between the maximum and minimum benefit realized by the algorithm over all inputs (and where $\Omega$ represents conventional "big O", or "order of", notation). The lower bound is achieved when reserving 1/log k of the resource doubles the price.

The worst case occurs when the offline algorithm "sells" (provides access to) the entire resource at the maximum bid, P, which was rejected by the online algorithm. For the online algorithm to reject this bid, it must have set the price greater than P, which means that it has already sold 1/log k of the resource for at least P/2.

$$B_{online} > P/(2 \log k)$$

and $$B_{offline} - B_{online} < P$$

yields $r < 1 + 2 \log k$

Increasing price exponentially with increased utilization leads to a competitive ratio logarithmic in k.

B. Practical Pricing Function

The algorithmic framework defined above applies to bandwidth sharing in circuit-sharing networks with permanent connections. This framework can be adapted to distributed file systems by treating the path of file system operations, from the client's memory to server's disk, as a short-lived circuit. This approach gives an online strategy that is competitive with the optimal offline algorithm in the maximum usage of each resource. The algorithm derived from this approach is an online algorithm that knows nothing about the future, assumes no correlation between past and future, and is only aware of the current system state.

The pricing function, P, for an individual resource i can be defined in this framework, in which the utilization $u_i$ varies between 0 and 1, so that the price varies between 0 and $P_{max}$. Consider now the selection of k. With a very large k, the price function stays near zero until the utilization is almost 1. Then, the price goes up very quickly. With very small k, the resource becomes expensive at lower utilization, which throttles usage prior to congestion. Appropriate values of k provide incremental feedback as the resource becomes congested.

Heterogeneous resources of a network storage system can further complicate parameter selection. Different resources become congested at different levels of utilization, which dictates that parameters be set individually. The network typically exhibits few negative effects from increased utilization until near its capacity and, thus, calls for a higher setting of k. Similarly, memory typically works well until it is nearly full, at which point it experiences congestion in the form fragmentation and synchronous stalls from out-of-memory conditions. Disks, on the other hand, typically require smaller values of k, because each additional I/O interferes with all subsequent (and some previous) I/Os, increasing the service time by increasing queue lengths and potentially moving the head out of position.

The cumulative cost of all resources in the system can be approximated by the highest cost (most congested) resource. The highest cost resource corresponds well with the system bottle-neck. While there is theory behind more complex composite cost functions, is believed that these functions work less well in practice than the heuristic introduced here. The maximum price $P_{max}$ is the same for all server resources and the exponential nature of the pricing functions ensures that resources under load become expensive quickly.

In order to avoid the effects of over-tuning and enforce stability, we set two additional constraints on the cost function. Clients assign an infinitesimally higher value to the maximum price for their resources ($P_{max}$+e) than do servers. This ensures that when both the client and the server are overloaded, the client sends the operations to the server. In practice, servers deal with overload more gracefully than do clients. Also, the client's WTP is always be higher than a minimum price, $P_{min}$, so that if neither the client nor the server are congested, operations are performed at the server.

In one embodiment, a CA-NFS client accelerates a write when the server's price is lower than its WTP (or "bid") and it is also lower than $P_{min}$. The client follows the default NPS policy (double buffering) when the server price is higher than $P_{min}$ but lower than the client's WTP, and it defers the write when the client's WTP is lower than the server's price. Read-aheads are canceled when the client's WTP for the operation is lower than the server price and performed more aggressively when the WTP exceeds the server price.

C. Implementation

The approach introduced here is not limited to any particular types of resources managed. As a result, adding new resources to a system is straight-forward. In certain embodiments, the following five resources are managed: server CPU, network, server disk, client memory and server memory.

It is straight-forward to establish the utilization of server CPU accurately at any given time through system monitoring.

The manner of determining utilization of networks is also well known. However, network bandwidth is preferably time-averaged to stabilize the auction. Without averaging, networks fluctuate between utilization 0 when idle and 1 when sending a message. The price would be similarly extreme and erratic. Thus, the average network bandwidth over a few hundreds of milliseconds can be monitored to avoid such fluctuation.

Measuring server disk utilization is difficult due to irregular response times. Although observed throughput may seem to be a natural way to represent utilization, it is not practical because it depends heavily on the workload. A sequential workload experiences higher throughput than a random set of requests. However, disk utilization may be higher in the latter case, because the disk spends head time seeking among the random requests.

Accordingly, disk utilization can be measured by sampling the length of the device's dispatch queue at regular, small time intervals. The maximum disk utilization can be defined as, for example, 80 pending requests. It is not necessary to identify the locality among pending operations nor to use device specific information. It is also possible to measure disk utilization by examining the disk head seek time.

Pricing client and server memory consumption can be challenging, because memory is a single resource used by many applications for many purposes, such as caching for reuse, dirty buffered pages, and read-ahead. A cache should preserve a useful population of read-cache pages. Reserving more memory pages to buffer writes potentially reduces cache hit rates, because it reduces the effective size of the read cache.

Because a read blocks the calling application, it is desirable to maximize the read hit rate of the client's cache. To accomplish that, one can identify the portion of RAM that is actively used to cache read data and the effectiveness of that cache. The memory cost increases if the existing set of pages yields a high cache hit rate or there are a large number of dirty pages that have triggered write-back to disk.

In certain embodiments, two ghost caches are used to track the utility of read cache pages and to detect when writes should be accelerated or deferred because they interferes with read cache performance. Specifically, in a ghost miss cache holds meta-data information on blocks recently evicted from the cache. It records the history of a larger set of blocks than can be accommodated in the actual cache. A ghost hit cache contains the contents of a smaller virtual memory. It contains information about all of the write buffered pages and the most recent/frequent read cache pages. The memory area outside of the ghost hit cache contains the least recent/frequently read cache pages; e.g., if the system contained the maximum number of dirty buffered pages, then all read cache hits would occur in this reserved area. The ghost cache does not rely on a specific eviction policy; it simply tracks recently evicted pages. A more detailed description of the use of ghost caches is provided in A. Batsakis et al. "AWOL: An adaptive write optimizations in layer," *Conference on File and Storage Technologies* (2008).

Therefore, CA-NFS can define a virtual resource to monitor by using the distribution of read requests among the ghost caches to calculate the projected cache hit rates, and thus, the effective memory utilization. Specifically, the price of memory $u_{mem}$ can be computed as:

$$u_{mem}=(C(t)-GH(t)+GM(t))|reads(t)$$

where $C(t)$, $GH(t)$, and $GM(t)$ are the number of hits in the page cache, ghost hit cache, and ghost miss cache, and reads (t) is the number of total read requests during the last time interval. The quantity $C(t)-GH(t)+GM(t)$ counts the read requests that fall into the reserved area and in recently evicted pages. A large fraction of read requests falling in these regions indicates that the client would benefit from more read caching, so deferring writes is not of particular benefit.

For client read-ahead effectiveness, it is also possible to define a virtual resource that captures the expected efficiency of read-ahead. A metric of read-ahead confidence can be based on the adaptive read-ahead logic in the Linux kernel, as described by E. Anderson et al., "Quickly finding near-optimal storage designs," *ACM Transactions on Computer Systems* (2005). The confidence can be defined as the ratio of accesses to read-ahead pages divided by the total number of pages accessed for a specific file. For high values, the system performs read-ahead more aggressively. For low values, the kernel will be more reluctant to do the next read-ahead.

CA-NFS can be implemented by modifying an existing Linux NFS client and server. Specifically, support for the exchange of pricing information is added, and the NFS write operation is modified to add support for acceleration and deferral. Modifications are also made to the Linux memory manager to support the classification of the memory accesses and the read-ahead heuristics.

The CA-NFS server advertises price information to clients, which implement the scheduling logic. One possible way to convey this pricing information to the client is to override the NFS version 3 FSSTAT protocol operation. Normally, FSSTAT retrieves volatile file system state information, such as the total size of the file system or the amount of free space. Upon a client's FSSTAT request, the server encodes the prices of operations based on its monitored resource usage. In one embodiment of the technique introduced here, the server computes the statistics of the resource utilization and updates its local cost information once every second. In other embodiments, a different time interval or criterion could be used. FSSTAT is a lightweight operation that adds practically no overhead to the server, to the network, or to client applications.

In one embodiment, each client sends a pricing information request to the server every ten READ or WRITE requests or when the time interval from the previous query is more than ten seconds. In other embodiments, a different time interval or criterion could be used. As part of CA-NFS, it may be desirable to have the server notify active clients via callbacks when its resource usage increases sharply.

This method of price exchange allows CA-NFS and regular NFS clients and servers to co-exist in a single deployment.

The CA-NFS method described above it is now described further with reference to FIGS. 4 through 7. FIGS. 4A and 4B show two independent processes that can be performed within the storage server 2 as part of CA-NFS. Referring first to FIG. 4A, the server computes its current resource utilization statistics at 401, and then computes the price (cost), P, for those resources at 402. This process then repeats, for example, at a predetermined time interval. Referring to FIG. 4B, the server from time to time receives a pricing information request (e.g., an FSSTAT request) from a client at 411. In response to the request, the server sends its current price P to the requesting client at 412. In other embodiments, the server may simply broadcast its price P to all clients in response to a specified event (e.g., in response to computation of the price) or on a periodic basis. In certain embodiments, the processes of FIGS. 4A and 4B are performed by the CA-NFS layer in the server.

Figure 5:
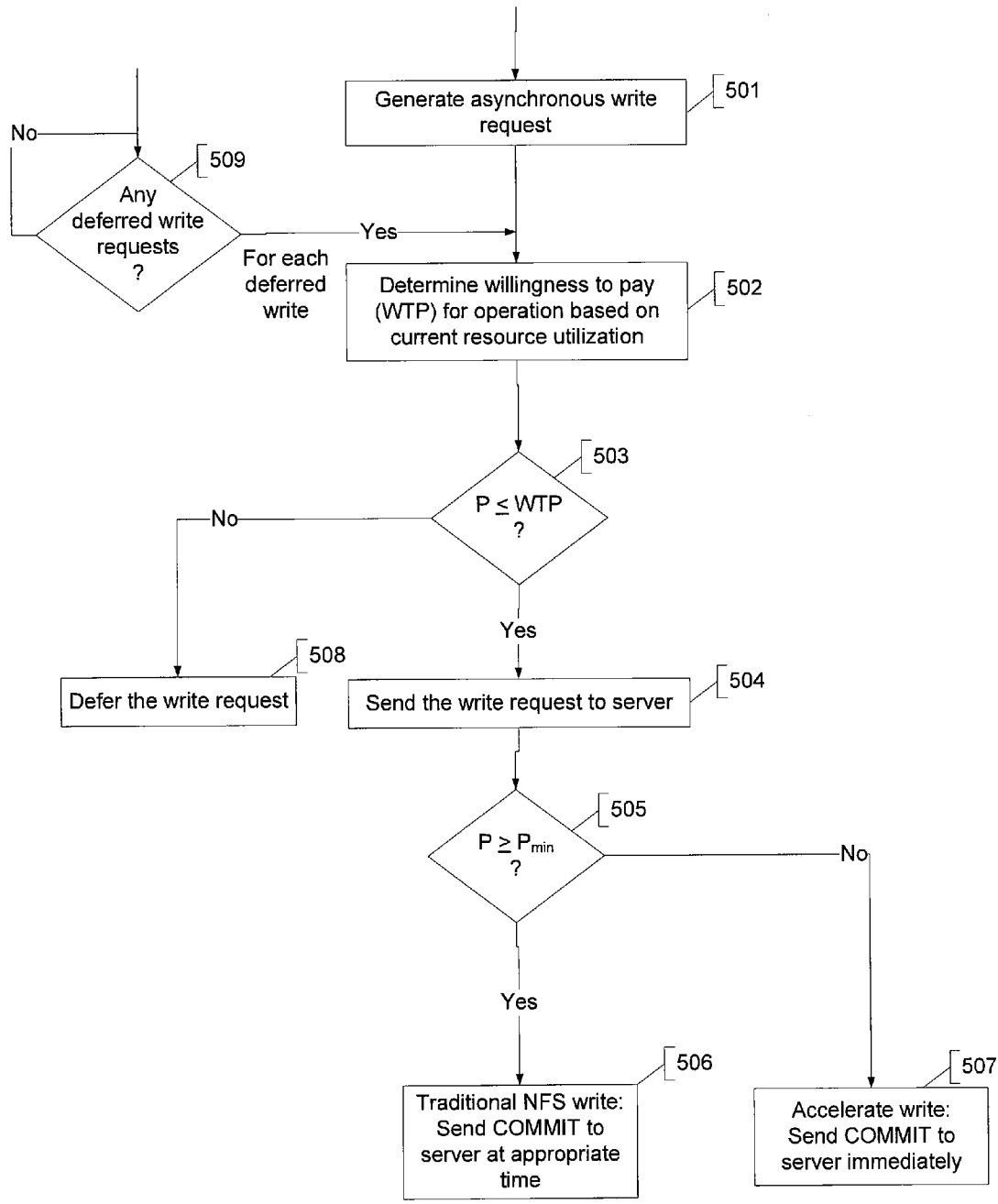
FIG. 5 illustrates an example of an asynchronous write process that can be performed in a client to implement the CA-NFS.

FIG. 5 illustrates an example of the asynchronous write process that can be performed in a client 1 to implement CA-NFS. In certain embodiments, the process of FIG. 5 is performed by the CA-NFS layer in the client, with the exception of operation 501. In 501, the user application on the client initially generates an asynchronous write request at 501. Next, at 502 the client determines a bid, or WTP, value for the requested operation, based on the client's current resource utilization. A methodology for computing this value is described above. Note that in some embodiments, computation of this value may be performed on an ongoing or periodic basis, or in response to an event other than generation of the write request.

At 503 the client compares the client-computed WTP with the server-computed price, P, which is assumed to have been received earlier from the server (e.g., in response to a pricing information request). If the price P is greater than the WTP, then at 508 the client decides to defer the write request, as discussed further below. If the price is less than or equal to the WTP, then the process proceeds to 504, at which the client sends the write request to the server. Next, the client compares the server computed price P to the minimum price $P_{min}$. If the current price P is greater than or equal to the minimum price $P_{min}$, then at 506 the client executes the traditional NFS write process, i.e., the client sends an NFS COMMIT command to the server at the appropriate time (based on the usual criteria). On the other hand, if the current price P is less than the minimum price $P_{min}$, then at 507 the client accelerates the write operation by immediately sending a COMMIT command to the server.

As mentioned above, a write request may be deferred at operation 508. Accordingly, in parallel with the above-described operations, another branch of the process may be performed in which the client determines at 509 (periodically or in response to a specified event) whether there are any asynchronous writes that have been deferred. If one or more write requests have been deferred, this branch of the process invokes the above-described process from operation 502, as described above, for each deferred write request.

Figure 6:
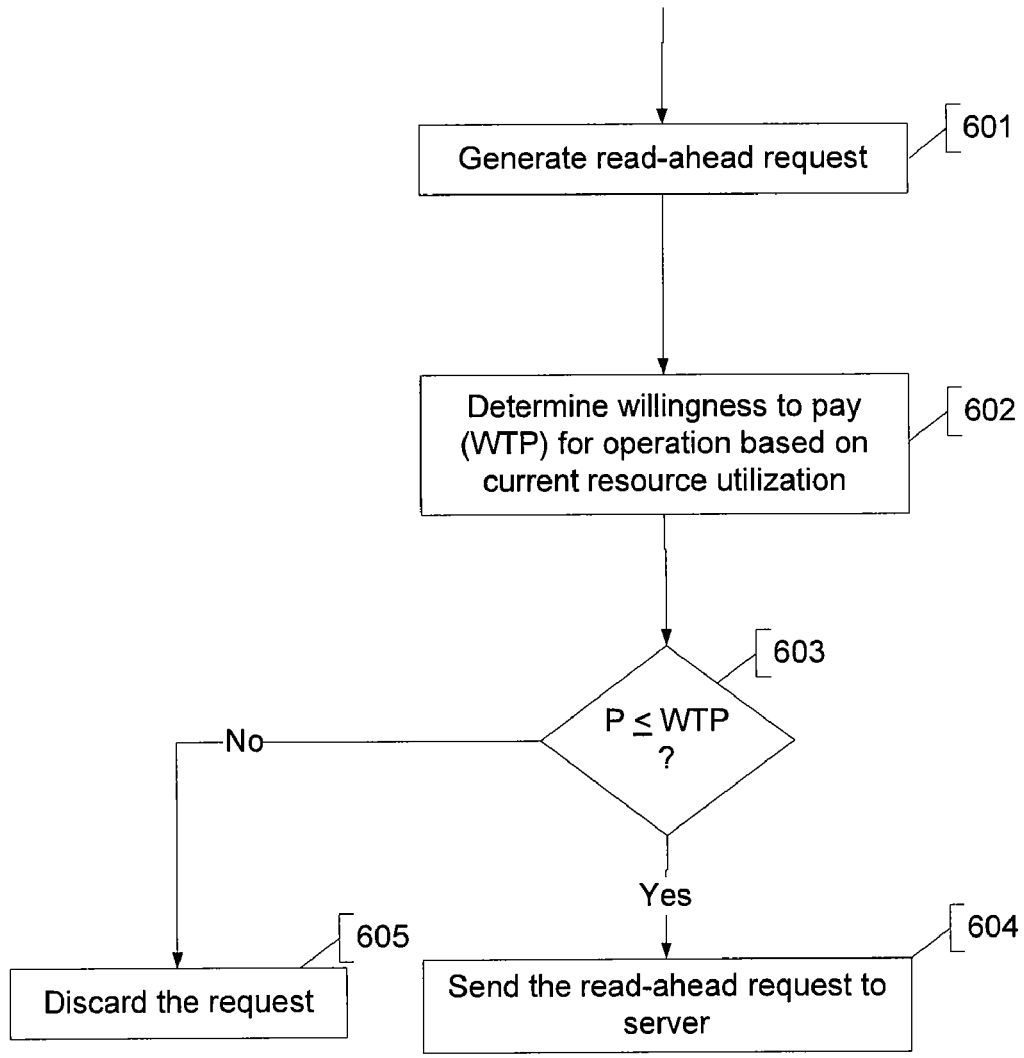
FIG. 6 illustrates an example of the asynchronous read (read-ahead) process that can be performed in a client 1 to implement the CA-NFS.

FIG. 6 illustrates an example of the asynchronous read (read-ahead) process that can be performed in a client 1 to implement CA-NFS. In certain embodiments, the process of FIG. 6 is performed by the CA-NFS layer in the client, with the exception of operation 601. Initially the user application generates a read-ahead request at 601. Next, at 602 the client determines a WTP value for the operation based on its current resource utilization. The client then compares the WTP value with the latest server-computed price P at 603. If the WTP is greater than or equal to the price P, the client sends the read-ahead request to the server at 604. Otherwise, the client simply discards the read-ahead request at 605, without ever having sent it to the server.

Figure 7:
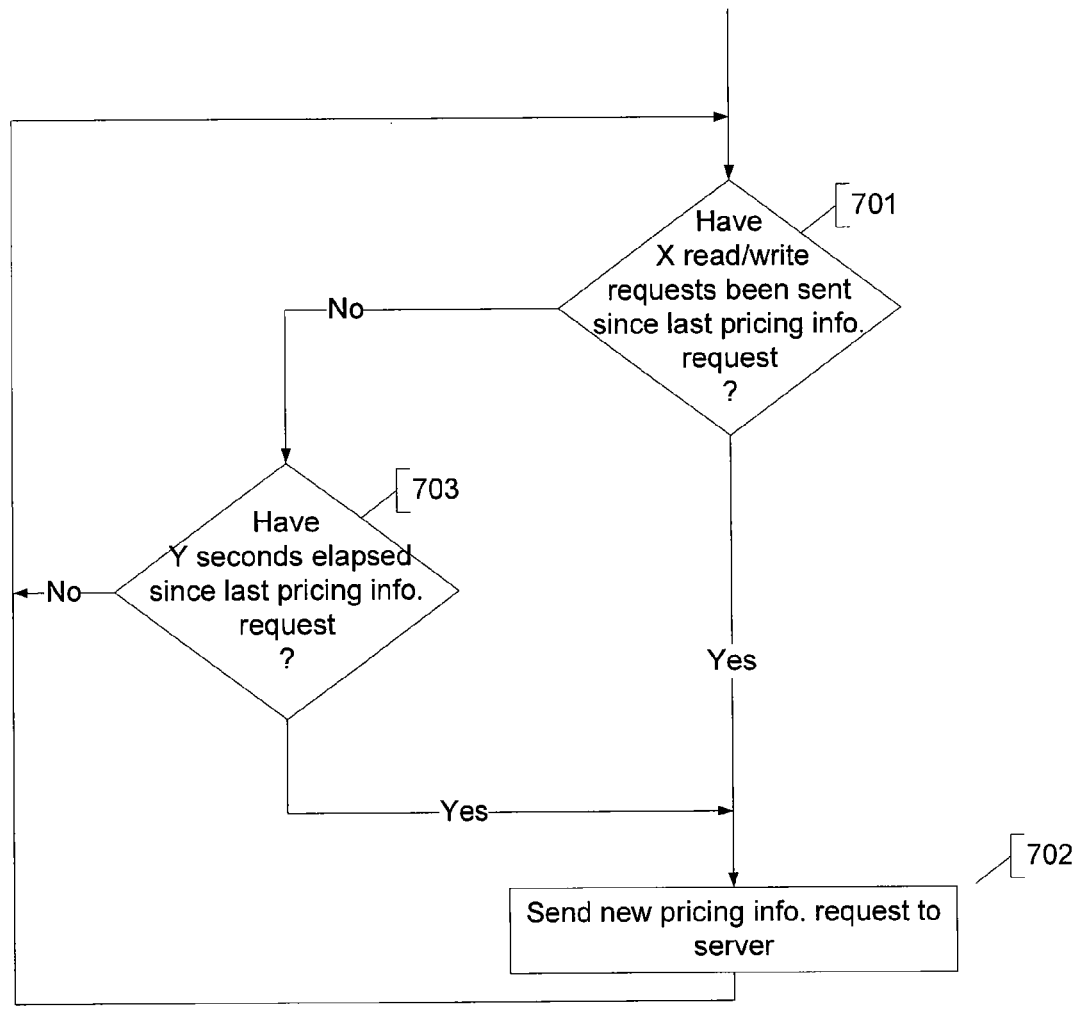
FIG. 7 illustrates an example of the process by which a client can request an updated price P from the server.

FIG. 7 illustrates an example of the process by which a client can request an updated price P from the server. In certain embodiments, the process of FIG. 6 is performed by the CA-NFS layer in the client. Initially, at 701 the client determines whether a predetermined number X of read or write requests have been sent to the server since the client sent the last pricing information request to the server. If the outcome of 701 is affirmative, then the client sends in a new pricing information request to the server at 702. As described above, the server responds to a pricing information request by sending its most current price P to the requesting client. The process then loops back to 701.

If the outcome of 701 is negative, then at 703 the client determines whether a predetermined number Y of seconds have elapsed since the last pricing information request was sent to the server. If the outcome of 703 is affirmative, then the client sends a new pricing information request to the server at 702, and the process then loops back to 701. If the outcome of 703 is negative, the process loops back to 701 directly from 703, without sending a new pricing information request.

Figure 8:
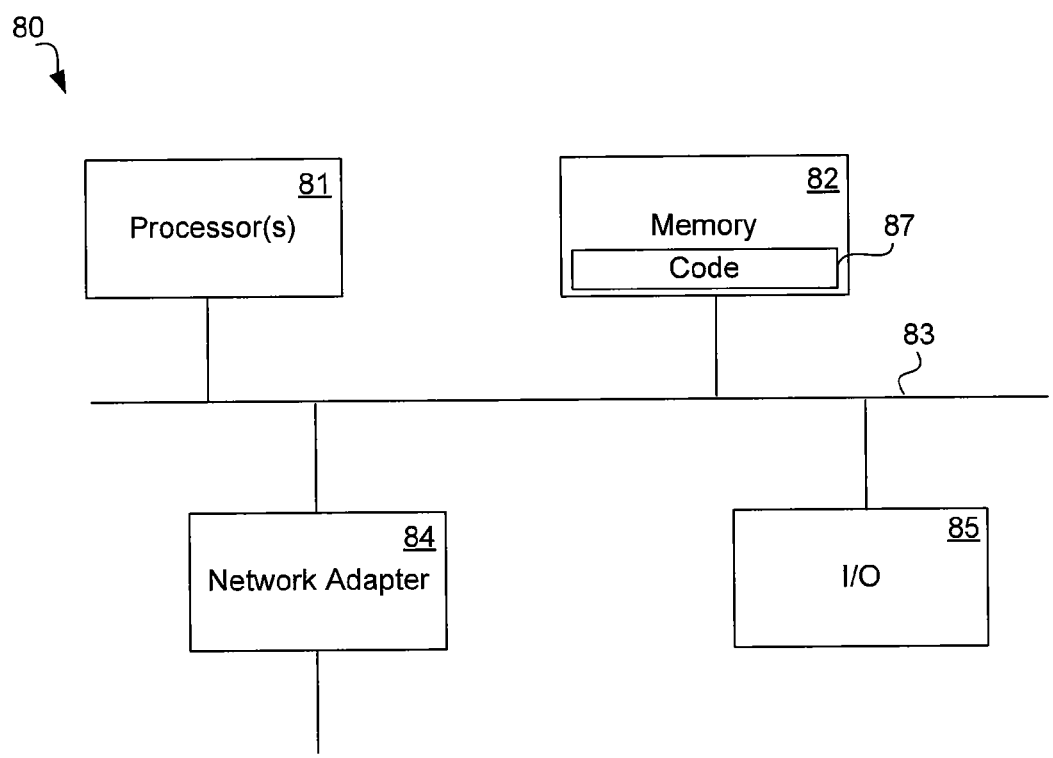
FIG. 8 is a high-level block diagram showing an example of the architecture of a processing system, which can be representative of a storage server or client.

FIG. 8 is a high-level block diagram showing an example of the architecture of a processing system 80, which can be representative of the storage server 2 or any client 1. The processing system 80 includes one or more processors 81 and memory 82 coupled to an interconnect 83. The interconnect 83 shown in FIG. 8 is an abstraction that represents any one or more separate physical buses, point-to-point connections, or both, connected by appropriate bridges, adapters, or controllers. The interconnect 83, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 81 is/are the central processing unit (CPU) of the processing system 80 and, thus, control the overall operation of the processing system 80. In certain embodiments, the processor(s) 81 accomplish this by executing software or firmware stored in memory 82. The processor (s) 81 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 82 is or includes the main memory of the processing system 80. The memory 82 represents any form of random access memory (RAM), read-only memory (ROM), flash memory, or the like, or a combination of such devices. In use, the memory 82 may contain, among other things, code 87 embodying, for example, the storage operating system 24 or the client software 20 stack shown in FIG. 2.

Also connected to the processor(s) 81 through the interconnect 83 are a network adapter 84 and an I/O device 85. The network adapter 84 provides the processing system with the ability to communicate with remote devices over the interconnect 3 and may be, for example, an Ethernet adapter or Fibre Channel adapter. In the case of the storage server 2, the I/O device 85 can be a storage adapter that allows the storage controller 2 to access the storage subsystem 4 and may be, for example, a Fibre Channel adapter or SCSI adapter. In the case of a client 1, the I/O device 85 can be, for example, a display device, keyboard, mouse, audio speaker, microphone, or the like.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   operating a network storage system that includes a storage server and a plurality of storage clients;
   applying a bid-price auction model to requests for asynchronous storage operations received from the storage clients, wherein bid values of the storage clients and price values of the storage server are dynamically set based on utilization of computing resources of each of the storage clients and the storage server, respectively; and
   scheduling the asynchronous storage operations based on a result of applying the bid-price auction model and based on a prioritization wherein synchronous storage operations have a higher scheduling priority than the asynchronous storage operations.

2. A method as recited in claim 1, wherein scheduling the asynchronous storage operations comprises:
   scheduling execution of file system operations based on the result of applying the bid-price auction model.

3. A method as recited in claim 1, wherein scheduling the asynchronous storage operations comprises:
   scheduling execution of asynchronous file system operations based on the result of applying the bid-price auction model.

4. A method as recited in claim 1, wherein scheduling the asynchronous storage operations based on a prioritization comprises:
   determining a prioritized order for the asynchronous storage operations based on relationships between the bid values and the price values.

5. A method as recited in claim 4, wherein determining the prioritized order based on relationships between the bid values and the price values comprises:

assigning an asynchronous storage operation of a first client of the storage clients a higher priority than an asynchronous storage operation of a second client of the storage clients based on a bid value of the first client being greater than a bid value of the second client.

6. A method of operating a storage client in a network storage system that includes a storage server and the storage client, the method comprising:
  determining in the storage client a current utilization of computing resources of the storage client;
  computing a bid value in the storage client based on the current utilization of the computing resources of the storage client;
  receiving a price value from the storage server, the price value having been computed by the storage server based on a current utilization of computing resources of the storage server;
  generating a request in the storage client for the storage server to perform an asynchronous storage operation; and
  determining a priority of executing the asynchronous storage operation based on a relationship between the bid value and the price value, wherein the priority of executing the asynchronous storage operation is lower than a priority of executing one or more synchronous storage operations.

7. A method as recited in claim 6, wherein the asynchronous storage operation is a write operation, and wherein determining the priority of executing the asynchronous storage operation comprises:
  deferring sending the request to the storage server when the bid value is less than the price value.

8. A method as recited in claim 6, wherein the asynchronous storage operation is a write operation, and wherein determining the priority of executing the asynchronous storage operation comprises:
  accelerating execution of the write operation relative to other asynchronous storage operations when the bid value is greater than the price value.

9. A method as recited in claim 6, wherein the asynchronous storage operation is a read operation, and wherein determining the priority of executing the asynchronous storage operation comprises:
  canceling the request when the bid value is less than the price value.

10. A method as recited in claim 6, wherein computing the bid value comprises computing the bid value based on utilization of memory of the storage client, and wherein the price value has been computed based on utilization of CPU and memory of the storage server.

11. A method as recited in claim 10, wherein the price value further has been computed based on:
  utilization of network bandwidth; and
  utilization of nonvolatile storage of the storage server.

12. A method as recited in claim 6, further comprising:
  requesting the price value from the storage server.

13. A method of operating a network storage system that includes a storage server and a plurality of storage clients, the method comprising:
  in the storage server,
    determining a current utilization of computing resources of the storage server,
    computing a price value based on the current utilization of the computing resources of the storage server, and
    sending the price value to each of the storage clients; and
  in each of the storage clients,
    determining a current utilization of computing resources of the storage client,
    computing a bid value for an asynchronous file system operation, based on the current utilization of the computing resources of the storage client,
    generating a request for the storage server to perform the asynchronous file system operation, and
    determining a priority of executing the asynchronous file system operation that is lower than a priority of executing one or more synchronous storage operations and is based on a relationship between the bid value and the price value, wherein:
      when the asynchronous file system operation is an asynchronous write, the storage client defers sending the request to the storage server if the bid value is less than the price value and accelerates execution of the write relative to other asynchronous file system operations if the bid value is greater than the price value, and
      when the asynchronous file system operation is an asynchronous read, the storage client cancels the request if the bid value is less than the price value.

14. A method as recited in claim 13, wherein:
  the bid value is computed by each client based on utilization of memory of the storage client; and
  the price value is computed based on utilization of CPU and memory of the storage server.

15. A method as recited in claim 14, wherein the price value further is computed based on:
  utilization of network bandwidth; and
  utilization of nonvolatile storage of the storage server.

16. A processing system configured to operate as a network endpoint in a network storage system, the processing system comprising:
  a processor;
  a network interface through which to communicate with another network endpoint via a network; and
  a storage medium storing instructions which, when executed by the processor, cause the processing system to perform a process that includes:
    determining a current utilization of a computing resource of the processing system;
    computing a first value based on the current utilization of the computing resource of the processing system; and
    determining a priority of a request for an asynchronous storage operation in the network storage system relative to other storage operations of the network storage system, based on a relationship between the first value and a second value, the second value having been computed based on a current utilization of resources of the network storage system that are outside said processing system.

17. A processing system as recited in claim 16, wherein the processing system is a storage client, and wherein the second value is based on current utilization of resources of a storage server in the network storage system.

18. A processing system as recited in claim 17, wherein said process further includes:
  requesting the second value from the storage server;
  receiving the second value from the storage server; and
  generating the request for the asynchronous storage operation.

19. A processing system as recited in claim 16, wherein the asynchronous storage operation is a file system operation.

20. A processing system as recited in claim 16, wherein the asynchronous storage operation is an asynchronous file system operation.

21. A processing system as recited in claim 20, wherein the asynchronous storage operation is an asynchronous write, and wherein determining the priority of the request comprises:
deferring sending the request when the first value is less than the second value.

22. A processing system as recited in claim 20, wherein the asynchronous storage operation is an asynchronous write, and wherein determining the priority of the request comprises:
accelerating execution of the asynchronous write relative to the other storage operations when the first value is greater than the second value.

23. A processing system as recited in claim 20, wherein the asynchronous storage operation is an asynchronous read, and wherein determining the priority of the request comprises:
canceling the request when the first value is less than the second value.

24. A processing system as recited in claim 16, wherein:
the first value is based on utilization of memory of the processing system; and
the second value is based on utilization of CPU and memory of another processing system in the network storage system.

25. A processing system as recited in claim 24, wherein the second value is further is based on:
utilization of network bandwidth; and
utilization of nonvolatile storage of said other processing system.

26. A system comprising:
a network endpoint in a network storage system that includes a storage server and a storage client, the network endpoint being either the storage server or the storage client;
auction means for applying a bid-price auction model to requests for asynchronous storage operations, wherein bid values and price values are dynamically set by the storage client and the storage server, respectively, based on utilization of computing resources of the storage client and the storage server; and
scheduling means for scheduling the asynchronous storage operations at the storage server based on a result of applying the bid-price auction model and based on a prioritization wherein synchronous storage operations have a higher scheduling priority than the asynchronous storage operations.

27. A system as recited in claim 26, wherein the scheduling means comprises:
means for scheduling execution of file system operations based on the result of applying the bid-price auction model.

28. A system as recited in claim 26, wherein the scheduling means comprises:
means for scheduling execution of asynchronous file system operations based on the result of applying the bid-price auction model.

29. A system as recited in claim 26, wherein the auction means comprises:
means for dynamically setting a bid value based on current utilization of computing resources of the storage client, and
means for dynamically setting a price value based on current utilization of computing resources of the storage server.

30. A system as recited in claim 29, wherein the auction means further comprises means for determining the prioritization based on a relationship between the bid value and the price value.

* * * * *